Fig. 4.

Nov. 13, 1934.    S. H. SHELLER    1,980,764
MACHINE FOR FASTENING COVERS TO FRUIT BASKETS
Filed Sept. 16, 1932    7 Sheets-Sheet 5

Inventor;
Samuel H. Sheller
By

Patented Nov. 13, 1934

1,980,764

UNITED STATES PATENT OFFICE 1,980,764

MACHINE FOR FASTENING COVERS TO FRUIT BASKETS

Samuel H. Sheller, Marion, Pa., assignor of one-half to George R. Hamlin, Washington, D. C.

Application September 16, 1932, Serial No. 633,504

41 Claims. (Cl. 140—93)

Fruit, such as peaches and apples, is commonly packed in baskets having bendable wire loops to afford connection to the projecting ends of a slat on a slatted cover, the fastening operation being manually effected, preferably by the use of a tool or appliance by which first one loop is engaged with the slat end and then the other loop is drawn into engagement with the remaining slat end.

Among earlier tools or appliances for this purpose is that set forth in my Patent No. 1,806,717, dated May 26, 1931.

Fastening the cover or lid to a packed fruit basket by hand has its limitations as to speed and satisfactory "lidding" of the basket although at present this is the practice commonly prevailing.

The present invention relates to a machine of improved construction and novel operation for automatically fastening the slatted lid or cover to a packed fruit basket, thereby dispensing with the use of manually operable tools, bars, or appliances heretofore commonly employed for this purpose and insuring a satisfactory and secure engagement of the basket loops with the ends of the fastening slat on the lid or cover.

Having previously invented an improved method of packing fruit wherein the fruit basket lid or cover is used as a facing former when in inverted position and the basket liner, containing the fruit, is superposed thereon in inverted position, after which the inverted fruit basket is telescoped over the filled liner, as set forth in my Patent No. 1,924,053, dated August 22, 1933, and application Serial No. 485,240, I have devised the present machine for the purpose of automatically fastening the lid or cover to the basket by the act of pulling down the inverted basket and causing the loops thereon to engage the ends of the fastening slat.

The packed basket with attached lid or cover then being in inverted position on the machine, while they might be thereupon removed by hand and reversed to set the basket in upright position, the present machine has means adapted to operate after the lid or cover has been fastened to the basket, to automatically turn the basket over so that it will require no further handling except its removal from the machine.

I am aware, however, that those improvements in the machine which relate to the automatic fastening of the cover to the basket may be used without employing the basket reversing means and I do not, therefore, except where so stated in the claims, limit the invention to the use of the basket reversing means although I intend to cover the combination of the cover fastening means and the basket reversing means where so stated in the claims.

I am also aware that changes may be resorted to in respect to the control and operation of the means by which the loops on the basket are engaged with the ends of the fastening slat on the cover. Therefore, except where specified in the claims, I do not limit the fastening means to the specific constructions illustrated and hereinafter described although I intend to claim the particular means shown where specifically set forth in the claims.

I am further aware that the various levers, arms, links and other mechanical elements entering into the means for operating and timing the cover fastening means and the basket reversing means, may be modified within the spirit and scope of the invention.

A practical embodiment of the invention which has been successfully used, is shown in the accompanying drawings and is hereinafter described.

The frame 1 of the machine preferably is of angle iron with flat side braces to afford the requisite strength without interfering with the freedom of movement of the parts hereinafter described.

The operative parts are operated by a treadle frame 2 pivoted at 3 to the lower parts of the legs at one side of the frame and suitably braced by a rod 4. A suitable treadle 5, connected to the frame 2, projects outwardly from the frame in convenient position for operation.

The frame 2 is provided with slots 6 through which extends rod 7 by which motion is communicated from the treadle to the operative parts, the rod being rigidly attached to a pair of levers 8 which are pivoted at 9 to the front legs of the frame 1 and are drawn upwardly by heavy contractile coil springs 10 which are attached thereto at 11 and whose upper ends are engaged with the frame 1 at 12.

The contraction of springs 10 normally keeps the levers 8 and the treadle frame 2 in the raised position shown in Figs. 1, 2, 3, and holds all of the operative parts in normal position so that the basket cover, its cap, the liner filled with fruit, and the metal tub may, as a unit, be placed on the machine, as illustrated by dot and dash lines in Fig. 4, preparatory to carrying out the steps shown in Figs. 5 and 6, as hereinafter described.

Located above the pair of levers 8 is a frame 13 whose arms have their ends pivoted at 14 to the front legs of the frame above the pivots 9.

The frame 13 is supported by, and spaced from, the levers 8 by supports 15, which are pivoted at 16 to the levers 8 and at 17 to the upper frame 13.

A cross shaft 18 journalled in the upper side braces of frame 1 at 19, whose functions will be presently described, serves as an abutment to arrest the upward movement of the frame 13 and to arrest the upward travel of the treadle frame 2 and treadle 5.

A fastening lever frame 20 is connected to, and supported horizontally by, the upper ends of the supports 15, whereby said fastening lever frame is pulled down when the treadle is depressed and is drawn upwardly by the springs 10 when the treadle is released.

Fastening levers 21 are pivotally carried by the frame 20 at the ends thereof on pivots 22, said fastening levers being connected by links 23 so that they will move simultaneously toward or away from each other when operated.

Figure 1:
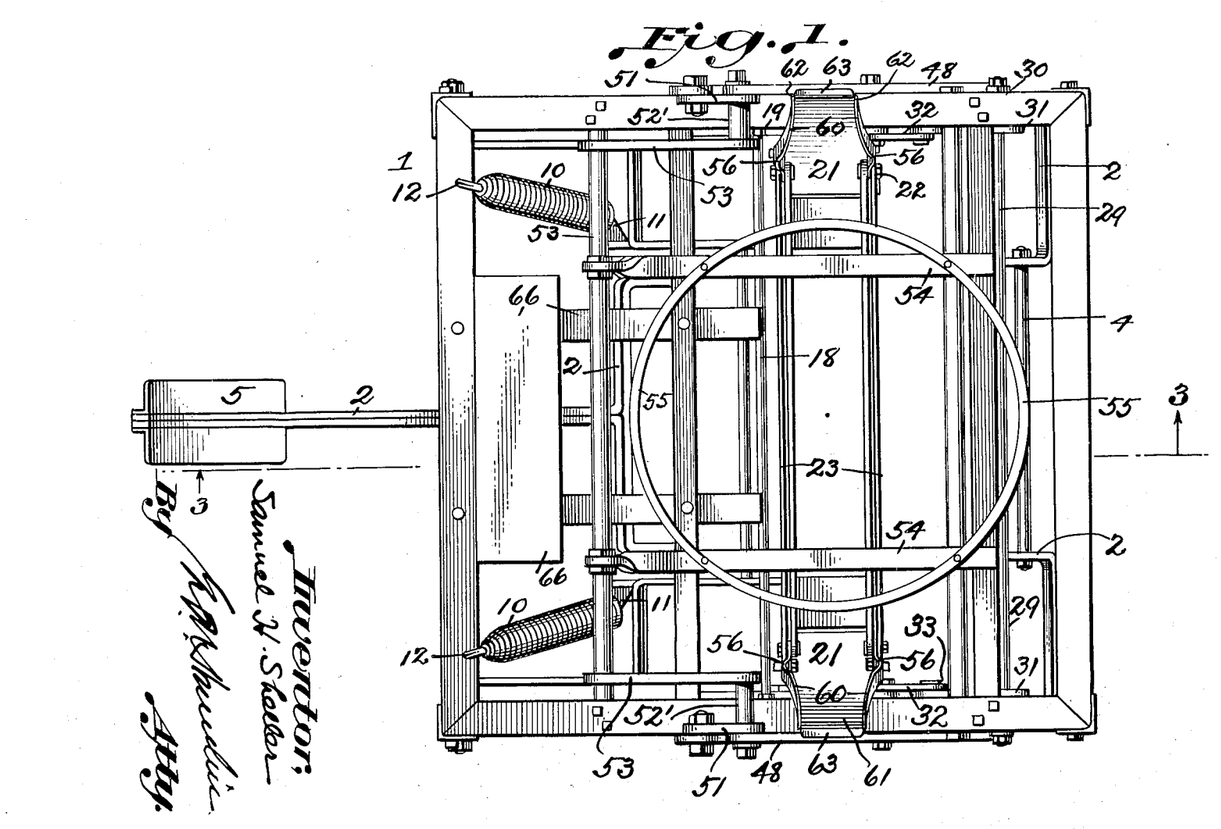
Figure 1 is a plan view of the machine when the parts are in normal position.
Figure 2:
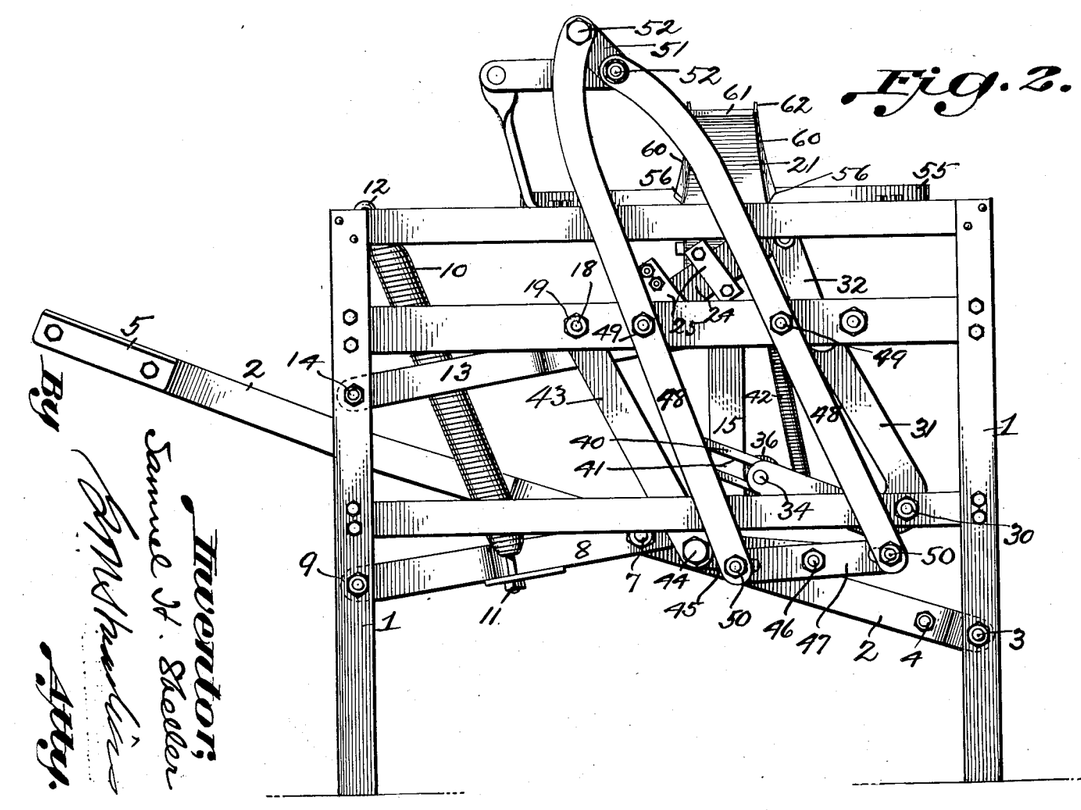
Fig. 2 is a side elevation, the parts being in normal position.
Figure 3:
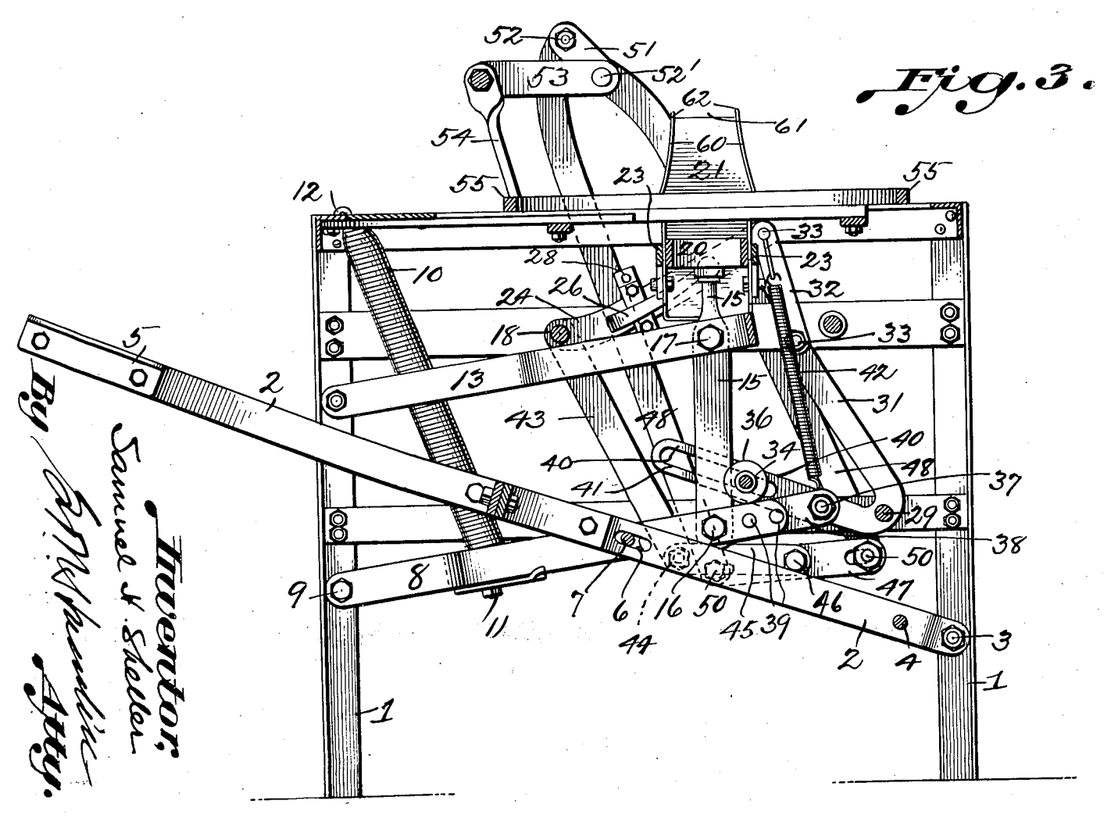
Fig. 3 is a vertical section on the line 3—3, Fig. 1.
Figure 4:
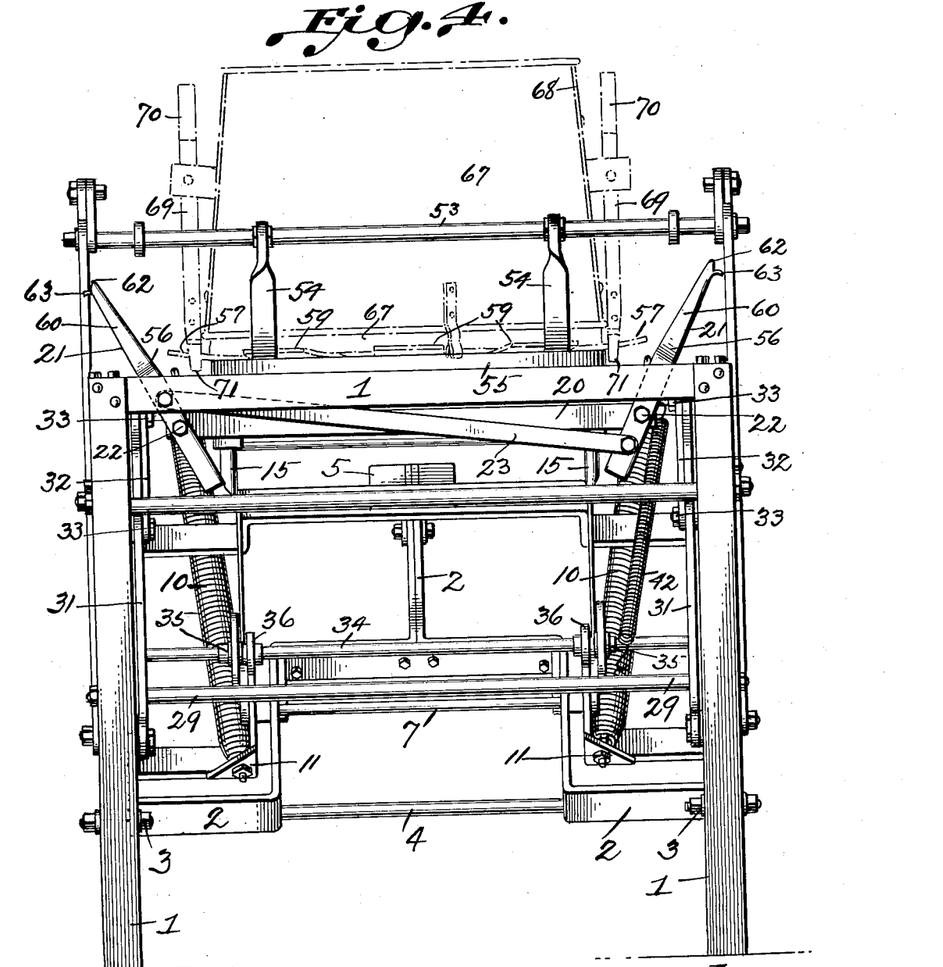
Fig. 4 is a front elevation, the parts being in normal position, dot and dash lines showing the lid or cover resting on the circular holder, the facing cap on the lid, and the filled liner inside of the removable metal tub, just prior to the step of removing the metal tub for subsequent application of the inverted basket over the filled liner.

Secured to the cross shaft 18 are arms 24 and fastened to these arms by screw clamps 25 are bow springs 26 of the general type employed in jaw animal traps, one leg of each spring being clamped against the side of an arm 24 and the other arm being free and having a button 27 which constantly bears against the back of a fastening lever 21 so that the two springs 26 will swing the levers 21 away from each other and maintain them in the position shown in Figs. 1, 3, 4 when the parts of the machine are in their normal positions. When the parts of the machine are in their normal positions, the frame 20 being in raised position, the buttons 27 of the springs 26 bear on the fastening levers 21 below the pivots 22, thus spreading the levers 21 apart.

Figure 6:
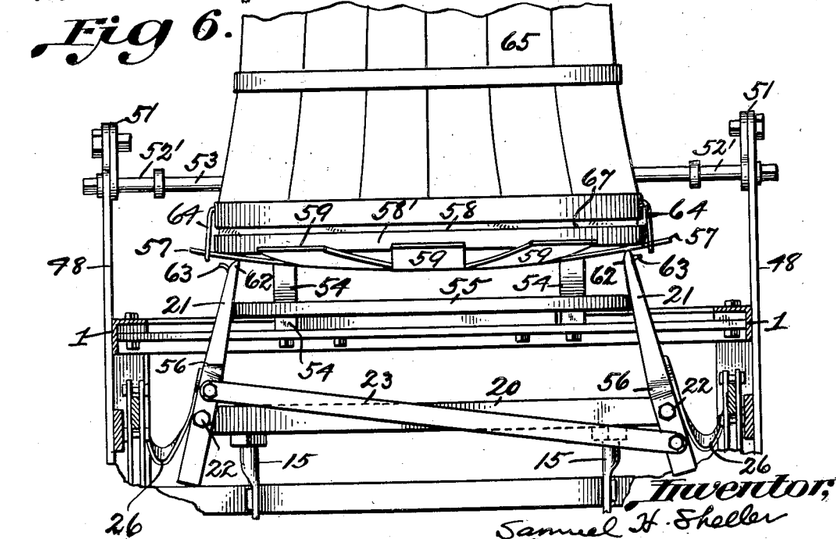
Fig. 6 is a similar view, the machine having been operated to cause the fastening levers to pull the inverted basket down on the lid or cover and to engage the loops with the ends of the slat on the cover, thus completing the operation of fastening the lid to the filled basket.
Figure 8:
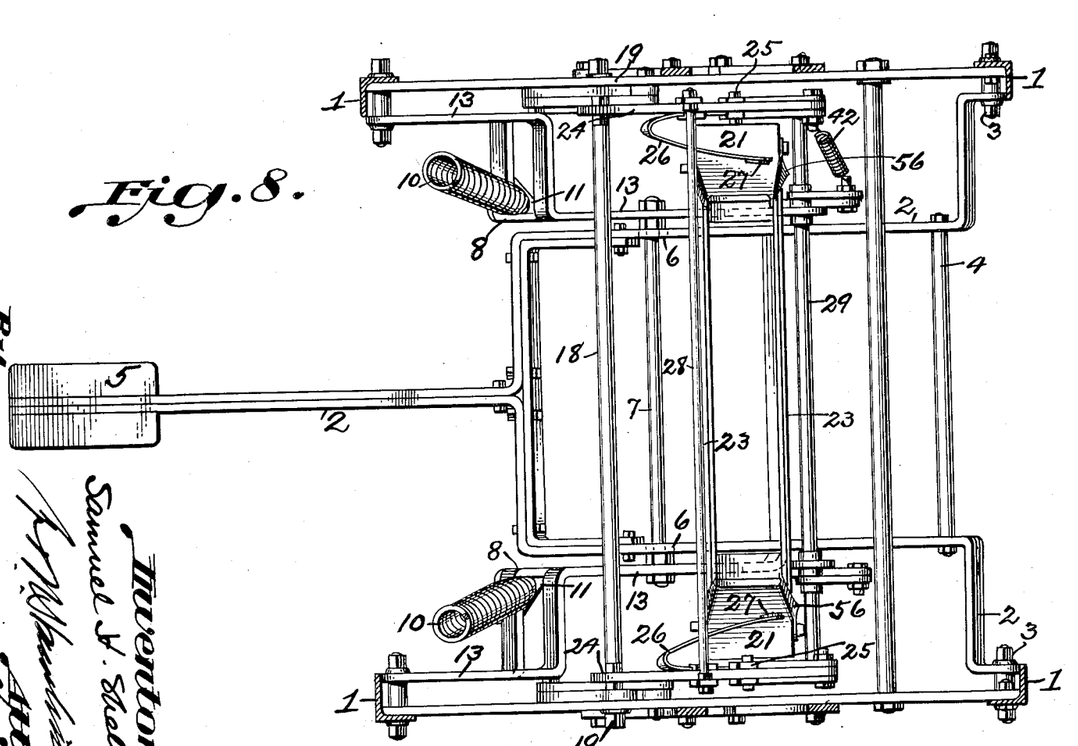
Fig. 8 is a horizontal section on the line 8—8, Fig. 7, the parts being in the position shown in Fig. 6.

When the treadle 5 is depressed, the descent of the frame 20 causes the fastening levers 21 to descend relatively to the bow springs, said levers sliding downwardly past the buttons 27 until the bow springs apply their pressure above the pivots 22 and thereupon force the upper ends of the fastening levers 21 toward each other, as illustrated in Figs. 6 and 8. When the frame 20 rises, the upward shifting of the fastening levers 21 in relation to the springs 26 enables the springs to apply their pressure against the parts of the levers 21 below the pivots 22, thus restoring the fastening levers 21 to normal, spread position.

While I have found springs of the type shown at 26 to be peculiarly adapted for spreading and closing the levers 21 in relation to each other, nevertheless I am aware that modifications may be resorted to in regard to the application of spring pressure to the levers 21.

Preferably, the arms 24, or one set of the clamps 25 are connected by a brace rod 28 to strengthen the arms.

At the rear of the machine, above the treadle frame 2, is a cross shaft 29 which is journalled at 30 in the lower side braces.

Securely attached to the shaft 29 are bell crank levers 31 which have their upper arms connected by links 32 to the ends of the arms 24, suitable pivotal connections 33 being provided at the ends of the links. Means are thus provided for operating the arms 24 and turning the shaft 18, as will presently appear.

Journalled in the forward ends of the lower arms of the bell crank levers 31 is a shaft 34. Secured to the shaft 34 are grooved collars 35.

Rotatable on the shaft 34 are stop-rollers 36 which serve to arrest the upward swing of the rear ends of the arms 8.

Pivoted at 37 to short extensions 38, fastened at 39 to the rear ends of the levers 8, are forwardly extending links 40 having slots 41 which receive the grooved collars 35.

The lost-motion connection between the levers 8 and the shaft 34 comprising the slotted links 40, permits the treadle frame 2, levers 8, the supports 15, and upper frame 13 to pull down the fastening lever frame 20 and carry the fastening levers 21 downwardly for the purpose of fastening the lid to the basket before the parts now to be described having to do with the tilting of the lidded basket carrier begin to operate.

Figure 7:
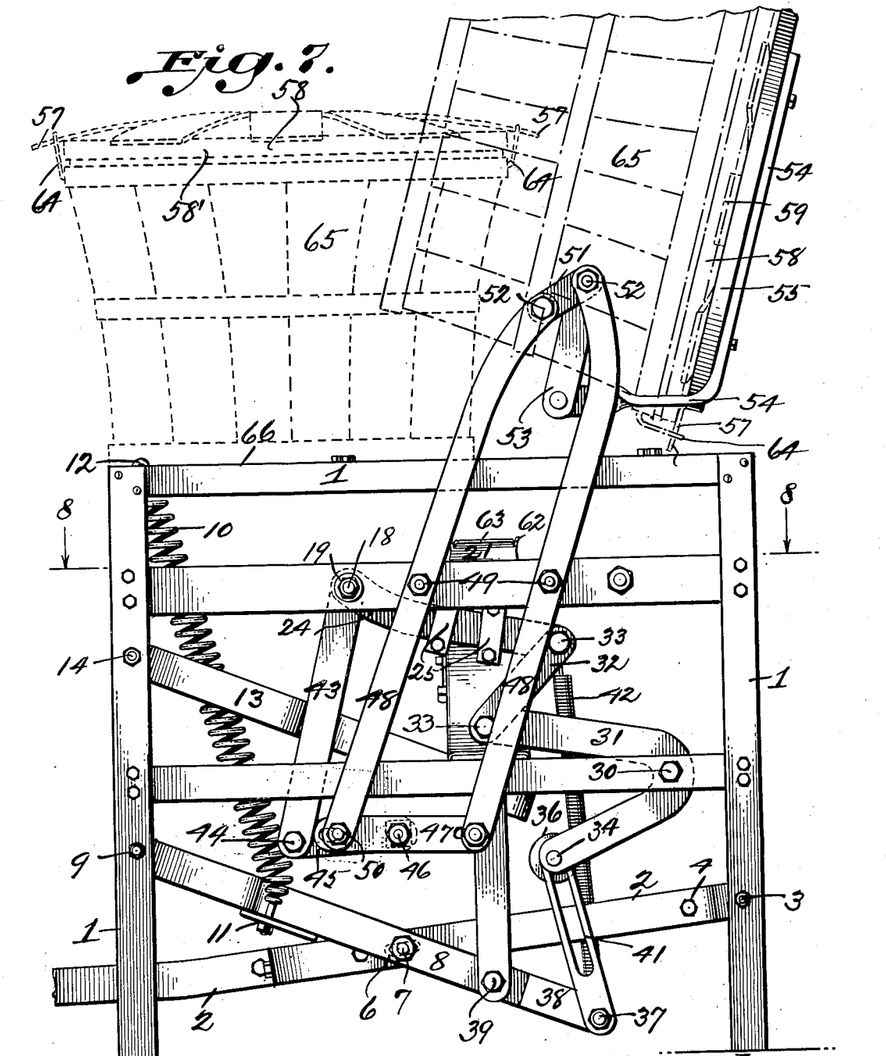
Fig. 7 is a side elevation illustrating a continuance of the cycle of operation of the machine by which the lidded basket is swung upwardly first to assume the right hand dot and dash position representing the step preparatory to turning the basket to the left hand upright dotted line position.

A contractile coil spring 42 which extends between, and is connected to, pivots 33 and 37, causes the frame 20 to return to raised position before the basket carrier returns to lowered, normal, position from the dot and dash line position shown in Fig. 7, thus enabling the fastening hooks 21 to spread in relation to each other and avoid interference with the basket carrier on its return movement.

Secured to the cross shaft 18 and projecting downwardly and rearwardly therefrom are arms 43 to which are pivoted at 44, rearwardly extending links 45. Pivoted to the links 45 at 46 are cross heads 47.

Pairs of substantially parallel upright levers 48, which are pivoted at 49 to the side braces of frame 1, have their lower ends pivoted at 50 to the cross heads 47 on opposite sides of the pivots 46.

The upper ends of the pairs of upright levers 48 are connected by cross heads 51 to which they are pivoted at 52. One of each pair of pivots 52 serves as a crank pin 52' for a crank frame 53 which is thus bodily carried by the pairs of levers 48.

The crank frame 53 has arms 54 extending toward the rear of the machine and carrying a circular support 55 on which and on the arms 54 the basket lid or cover is adapted to rest.

The crank frame 53, arms 54 and circular support 55, supported by the upright levers 48, constitute a shiftably mounted, swinging basket carrier whose normal position is that of Figs. 1, 2, 3, 4, 5, 6 and whose shifted position is that of Fig. 7.

The fastening levers 21 are of trough-like form in cross sectional shape, being widest at the points 56 to accommodate the projecting ends 57 of the fastening slat which, according to the usual practice, is provided on the lid or cover 58. The shorter slats of the lid or cover 58 are shown at 59.

From the widest part 56, the side walls 60 of the fastening levers converge to the mouths 61 of said levers, where they are provided with horns 62. Across the upper, open ends of the fastening levers 61 extend flanges or lips 63.

The converging form of the side walls 60 causes the ends 57 of the fastening slat to be directed toward the horns 62 and the lip or flange 63 when the machine is operated and the fastening lever frame 20 descends, thereby to align said slat ends 57 with the usual bendable wire loops 64, carried by the basket 65, to insure that the fastening levers 21 draw down and bend these loops and pass them over the fastening ends 57 of the fastening slat.

Figure 5:
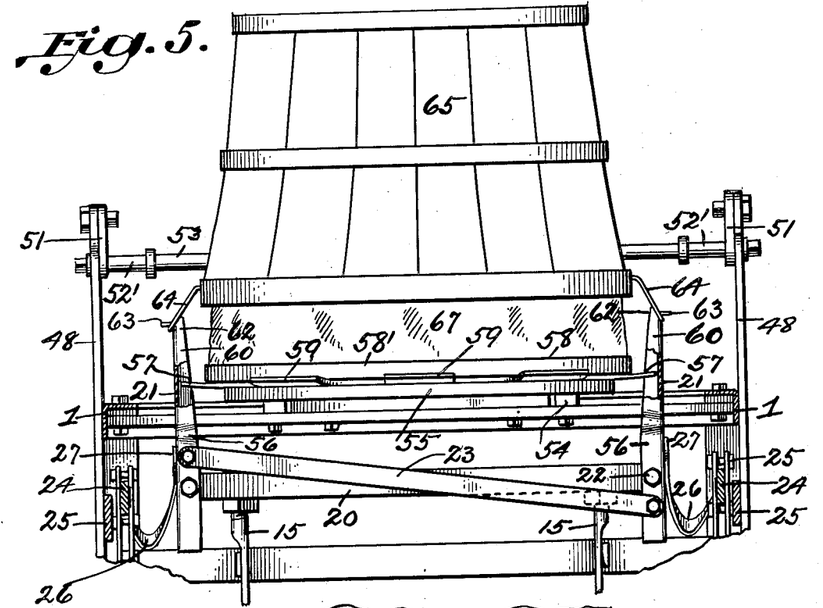
Fig. 5 is a detail fragmentary section, the metal tub having been removed, the inverted basket telescoped over the filled liner, and the loops on the basket having been manually engaged with the fastening levers prior to the operation of the machine.

The lips or flanges 63 having first been manually hooked into the loops 64 when the inverted basket is in the position shown in Fig. 5, the descent of the frame 20 and the fastening levers 21, first centers the ends 57 in the fastening levers 21 and as the ends 57 of the fastening slat pass out through the open upper ends of the fastening levers, the said levers bend and draw the loops 64 over the ends 57, as shown in Fig. 6, thus "lidding" the basket 65. It will be understood that the descent of the frame 20 and the fastening levers 21 first pulls down the inverted basket from the position shown in Fig. 5 to that shown in Fig. 6 and during this operation, the application of the loops over the ends 57 takes place.

While normally the bow springs 26 bear against the lower parts of the fastening levers 21 and maintain them in the positions shown in Figs. 1 and 4, nevertheless when the frame 20 descends, the downward movement of the fastening levers 21 relative to said springs causes the springs to apply their pressure above the pivots 22 and consequently when the basket has been lidded, as shown in Fig. 6, the levers 21 are snapped by the springs 26 underneath the basket cover, as shown in said figure.

The fastening of the lid or cover 58 to the basket 65 takes place before the treadle 5 has been depressed to its full extent. Further depression of the treadle brings the upper end of the slots 41 into engagement with the shaft 34 and swings the bell crank levers 31, which thereupon turn the shaft 18 and through connections previously described, shifts the upright levers 48 and rocks the crank frame 53, the arms 54 and the support 55. This action brings the packed and lidded basket 65 to the dot and dash line position shown in Fig. 7, whereupon the basket is in an unstable position and it thereupon tilts forwardly toward the operator and assumes the upright position shown by dotted lines at the left of Fig. 7, being then supported by the platform 66 at the top of frame 1 (Fig. 1).

The return of the basket carrier to normal position brings about relative shifting of the fastening levers 21 and the bow springs 26 so that the bow springs can bear against the fastening levers below the pivots 22 thereof and restore the fastening levers to the normal spread position shown in Fig. 4.

The filled and lidded basket having been taken away by the operator, the parts are then in position for fastening a lid or cover to another packed basket, as previously described.

*Operation.*—The fruit basket cover 58 is first placed in inverted position on a table or suitable support and, preferably, a facing protective paper-board cap (not shown) is placed within the rim 58' of the cover and a facing layer of fruit is placed on said cap, as explained in my Patent No. 1,924,053 and application No. 485,240. The purpose of the facing cap or body is to prevent bruising of the fruit, as set forth in said applications.

The next step is to place on the inverted lid 58 a paper basket-liner 67, the lower part of which is shown in Figs. 4, 5, 6. Any paper liner suitable for the purpose may be used.

The next step is to telescope over the liner 67, the metal tub 68. Preferably, the tub 68 may be of the improved construction shown in my Patent No. 1,810,257, dated June 16, 1931, having the pivoted levers 69 whose upper ends constitute hand-holds 70 and whose lower ends are provided with loops 71, which are adapted to receive the projecting ends 57 of the fastening slat.

The fruit is then placed within the liner 67 until the latter is filled, the fruit being laid on top of the facing layer which is originally placed on top of the facing pad or cap carried by the cover 58.

When the liner 67 is completely filled, the handle 70 is grasped and the lid or cover 58, facing pad or cap, liner 67, and tub 68 are bodily lifted from the support which has previously held them and the entire unit is set down on the circuit support 55, as shown by dot and dash lines in Fig. 4.

When placing the cover 58 on the circular support 55, the operator aligns the fastening slat-ends 57 with the channels in the fastening levers 21. The wide parts 56 of the fastening levers enable the slat-ends 57 to be easily lined up with the levers.

The next step is to tilt levers 69 and disengage the loops 71 from the slat-ends 57 and to remove the metal tub 68 for use in another preliminary-packing operation.

The operator now inverts the fruit basket 65 and telescopes it over the liner 67 containing the fruit and as soon as it is down sufficiently for the purpose, he manually hooks the lip or flange 63 on one fastening lever 21 through one of the wire loops 64 of the basket and then hooks the flange 63 of the other fastening lever through the remaining loop 64, as shown in Fig. 5. It will be understood that when the basket 65 is thus telescoped over the fruit-filled liner 67, the basket can only be lowered approximately to the position shown in Fig. 5 on account of the size of the liner when filled, in its relationship to the internal size of the basket 65.

Heretofore, manually operated tools or appliances have been employed to force the lid or cover 58 against the basket and to engage the loops 64 with the projecting slat-ends 57.

The present machine entirely eliminates the use of hand tools or appliances for this purpose. Operations which will now be described, automatically pull the basket 65 downwardly and engage both of the loops 64 with the projecting ends 57, completing the "lidding" of the basket, that is, the fastening of the cover 58 to the basket top. The lidded basket is shown in Fig. 6, such action being effected by the operation of the machine.

When the lid or cover 58 has been fastened to the basket, as shown in Fig. 6, the packed and lidded basket can be immediately removed but would have to be reversed to bring it to the proper upright position. To automatically reverse the basket so that it will be brought to the proper upright position shown in dotted lines at the left of Fig. 7, the operation of the machine is continued after the parts have assumed the position shown in Fig. 6, for the purpose of swinging the basket carrier and basket to the position shown at the right of Fig. 7, whereupon the filled and lidded basket assumes an unstable position which causes it to tilt by gravity toward the left, Fig. 7, and to automatically assume the upright position shown by dotted lines, the base of the basket then resting on the platform 66. The basket may then be removed and the treadle 5 released to permit the springs 10 and 42 to restore the parts to their normal positions, ready for the lidding of another basket.

What I claim is:

1. In a machine for fastening lids or covers to containers, automatically-acting means for effecting engagement of the loops on the container with the ends of the fastening slat on the cover, and means for operating said automatically-acting means.

2. In a machine for fastening lids or covers to containers, automatically-acting means for effecting engagement of the loops on the container with the ends of the fastening slat on the cover adapted to automatically effect a preliminary relative movement of the container and cover to relatively dispose them for the initiation of the fastening operation, followed by drawing the loops over the ends of the fastening slat, and means for operating said automatically-acting means.

3. In a machine for fastening lids or covers to containers, automatically-acting bodily shiftable fastening devices adapted for shifting to engage the loops on the container and for automatic disposal of the loops around or over the ends of the fastening slat on the cover, and means for operating said bodily-shiftable fastening devices.

4. In a machine for fastening lids or covers to containers, automatically-acting bodily shiftable pivoted fastening levers adapted for shifting to engage the loops on the container and for automatic disposal of the loops around or over the ends of the fastening slat on the cover and means for operating said bodily-shiftable levers.

5. In a machine for fastening lids or covers to containers, bodily shiftable pivoted fastening levers adapted for engaging the loops on the container and for disposing the loops around or over the ends of the fastening slat on the cover, and means whereby the fastening levers are spread apart when in normal position and are shifted toward each other when operating.

6. In a machine for fastening lids or covers to containers means for applying the loops on the container to the ends of the fastening slat on the cover comprising a shiftable mounting, fastening levers pivoted to said mounting and adapted to move toward or away from each other and to be bodily shifted when the mounting moves, said levers being independently engageable with the respective loops on the container and serving to draw the container and cover together, followed by engagement of the loops with the slat.

7. In a machine for fastening lids or covers to containers, the combination with a support for a container cover, of automatically-acting fastening means movable relative to said support and adapted to automatically engage the loops on the container with the ends of the fastening slat of the cover while the cover is resting on said support.

8. In a machine for fastening lids or covers to containers, the combination with a support for a container cover, of fastening levers which are mounted to automatically swing and also to automatically bodily shift in relation to the container support, said levers being engageable with the loops on the container and adapted to draw the container toward its cover when said levers are automatically bodily shifted and to automatically apply the loops over the ends of the fastening slat on the cover.

9. In a machine for fastening lids or covers to containers, bodily shiftable pivoted fastening levers for applying the loops on the container to the ends of the fastening slat on the cover, in combination with springs arranged to co-operate with the levers either above or below the fulcrums or pivots of said levers according to the location of the levers, whereby the levers are spread apart or shifted toward each other by the action of said springs.

10. In a machine for fastening lids or covers to containers, the combination with a bodily shiftable support, of fastening levers fulcrumed thereto which are adapted to apply the loops on the container to the ends of the fastening slat on the container cover, and bow springs cooperating with said levers which apply their tension to the levers on one side or the other of the fulcrums of said levers, according to the position of the aforesaid support, whereby the levers are spread apart or are moved toward each other by the action of said springs according to the position of the support.

11. In a machine for fastening lids or covers to containers, a fastening lever of trough shape adapted to receive therein an end of the fastening slat on the cover, and means for operating said fastening lever.

12. In a machine for fastening lids or covers to containers, a fastening lever of trough shape adapted to receive therein an end of the fastening slat on the cover, said lever having loop engaging means, and means for operating said fastening lever.

13. In a machine for fastening lids or covers to containers, fastening levers of trough shape adapted to receive therein the ends of the fastening slat on the cover, said levers having lips or flanges adapted to hook into the loops on the container so that said loops may be applied over the ends of the fastening slat on the cover by the operation of said fastening levers and means for operating said fastening levers.

14. In a machine for fastening lids or covers to containers, fastening levers for engaging the container loops with the end of the fastening slat, said levers being provided with means adapted to engage loops on the containers and by their movement to apply the loops over ends of the fastening slat on the cover, and means for automatically operating said fastening levers to effect engagement of the loops with the ends of the slat.

15. In a machine for fastening lids or covers to containers, means for jointly connecting the loops on the container to the fastening slat on the cover by a single operation and operating means therefor.

16. In a machine for fastening lids or covers to containers, the combination with means for connecting the loops on the container with the ends of the fastening slat on the cover, of means adapted to act thereafter to automatically turn the covered container.

17. In a machine for fastening lids or covers to containers, the combination with means for fastening the loops on the container to the fastening slat on the cover when the cover and basket are in inverted or reversed position, of means adapted for thereafter turning the container into upright position with the applied cover uppermost.

18. In a machine for fastening lids or covers to containers, the combination with a combined support and reversing carrier adapted to support the container cover, the "packing", and the container in reversed position, of means adapted to apply the loops on the container to the ends of the fastening slat to secure the cover to the packed container, and means for operating said combined support and carrier to effect reversing of the packed container to bring it to an upright position with the applied cover uppermost.

19. In a machine for fastening lids or covers to containers, the combination with a combined support and reversing carrier adapted to support the container cover, the "packing", and the container in reversed position, of means adapted to apply the loops on the container to the ends of the fastening slat to secure the cover to the packed container, and means operated during the continuance of the complete cycle of operation of the machine adapted to shift the support and carrier to a position where the packed container will discharge therefrom into an upright position with the applied cover uppermost.

20. In a machine for fastening lids or covers to containers, automatically-acting means for simultaneously effecting engagement of the loops on the container with the ends of the fastening slat on the cover, adapted first to automatically effect a preliminary relative movement of the container and cover to relatively dispose them for the initiation of the fastening operation, followed by simultaneously drawing the loops over the ends of the fastening slat, and operating means for said automatically-acting means.

21. In a machine for fastening lids or covers to containers, automatically-acting bodily shiftable fastening devices adapted for shifting to engage the loops on the container and for simultaneous automatic disposal of the loops around or over the ends of the fastening slat on the cover, and operating means for said automatically-acting fastening devices.

22. In a machine for fastening lids or covers to containers, automatically-acting bodily shiftable pivoted fastening levers adapted for shifting to engage the loops on the container and for simultaneous automatic disposal of the loops around or over the ends of the fastening slat on the cover and operating means for said automatically-acting fastening levers.

23. In a machine for fastening lids or covers to containers, the combination with a support for a container cover, of automatically-acting fastening means movable relatively of said support and adapted to automatically simultaneously engage the loops on the container with the ends of the fastening slat of the cover while the cover is resting on said support.

24. In a machine for fastening lids or covers to containers, the combination with a support for a container cover, of fastening levers which are mounted to automatically simultaneously swing and also to automatically bodily shift in relation to the container support, said levers being engageable with the loops on the container and adapted to draw the container toward its cover when said levers are automatically bodily shifted and to simultaneously automatically apply the loops over the ends of the fastening slat on the cover.

25. In a machine for fastening lids or covers to containers, fastening levers adapted for effecting the engagement of attaching means on the container with the cover, and means for automatically operating said fastening levers to cause them to effect the engagement aforesaid, thereby to fasten the lid or cover to the container.

26. In a machine for fastening lids or covers to containers, fastening means for drawing the container and its lid or cover together and for attaching one to the other by connecting devices respectively carried by said container and its cover, and means for automatically operating said fastening means to accomplish the aforesaid drawing and fastening operations.

27. In a machine for fastening lids or covers to containers, fastening means for attaching one to the other by connecting devices respectively carried by said container and its cover, and means for automatically operating said fastening means to accomplish the aforesaid fastening operation.

28. In a machine for fastening lids or covers to containers when in reversed position, fastening means for attaching one to the other by connecting devices when in reversed position, means for automatically operating said fastening means to accomplish the aforesaid fastening operation, and means acting automatically thereafter to restore the covered or lidded container to normal position with its fastened lid uppermost.

29. In a machine for fastening lids or covers to containers, fastening means for drawing the container and its lid or cover together and for attaching one to the other by the simultaneous engagement of connecting devices respectively carried by said container and its cover, and means for automatically operating said fastening means to accomplish the aforesaid drawing and fastening operations.

30. In a machine for fastening lids or covers to open containers, wherein the container and its cover respectively carry connecting devices in the general region of their peripheries, fastening means for engaging said connecting devices one to the other, means for automatically operating said fastening means to effect simultaneous engagement of the connecting devices on the container with those on the cover to accomplish the aforesaid fastening operation, and operating means for said fastening means.

31. In a machine for fastening lids or covers to containers when in reversed position, wherein the container and its cover respectively carry connecting devices, fastening means for attaching one to the other when in reversed position, means for automatically operating said fastening means to effect simultaneous engagement of the connecting devices on the container and cover to accomplish the aforesaid fastening operation, and means acting automatically thereafter to restore the covered or lidded container to normal position with its fastened lid uppermost.

32. In a machine for fastening lids or covers to open containers, means for simultaneously connecting the cover to the container at a plurality of points in the general region of their peripheries by causing the engagement of independent connecting devices provided on the cover and container in the general region of their peripheries, and operating means for the aforesaid means.

33. In a machine for fastening lids or covers to containers, the combination with means for connecting the cover to the container when they are in reversed position, of means acting thereafter to turn the covered container into upright position with the applied cover uppermost.

34. In a machine for fastening lids or covers to containers, means for connecting the cover to the container, and means acting thereafter for reversing the position of the covered container.

35. In a machine for fastening lids or covers to containers, the combination with a combined support and reversing carrier adapted to support the container cover, the "packing", and the container in reversed position, of means for attaching the cover to the container, and means for operating said combined support and carrier to effect turning of the packed and covered container from reversed into upright position with the applied cover uppermost.

36. In a machine for fastening lids or covers to containers, automatically-acting means for effecting connection of a plurality of loops on one of them to the other of them at a plurality of points thereof.

37. In a machine for fastening lids or covers to containers, automatically-acting means for effecting simultaneous connection of a plurality of loops on one of them to the other of them at a plurality of points thereof.

38. In a machine for fastening lids or covers to containers, wherein one of them carries connecting devices at a plurality of points in the region of its periphery, automatically-acting means for effecting engagement of the other of them with the said connecting devices, adapted first to automatically effect a preliminary relative movement of the container and cover to relatively dispose them for initiation of the fastening operation, followed by the automatic engagement of the connecting devices, thereby to finally fasten the cover to the container.

39. In a machine for fastening lids or covers to containers, wherein both of them carry connecting devices at a plurality of points in the region of their peripheries adapted to be brought into engagement, automatically-acting means for effecting engagement of said devices, said means acting first to automatically effect a preliminary relative movement of the container and cover to relatively dispose them for initiation of the fastening operation, followed by the automatic engagement of the connecting devices with each other, thereby to finally fasten the cover to the container.

40. In a machine for fastening lids or covers to containers, wherein one of them carries a plurality of independent connecting devices adapted to be brought into engagement with the other of them, automatically-acting means for effecting the said engagement of the said plurality of independent connecting devices.

41. In a machine for fastening lids or covers to containers, the combination with a shiftable support for the cover and container, of automatically operating means acting first to fasten the cover to the container while said container and its cover are mounted on said support, and means acting thereafter to shift said support to turn the covered container to cause it to assume another position when discharged from the said support.

SAMUEL H. SHELLER.